US005947530A

United States Patent [19]
Harle

[11] Patent Number: 5,947,530
[45] Date of Patent: Sep. 7, 1999

[54] LIVE SWIVEL COUPLING

[75] Inventor: William W. Harle, West Salem, Ohio

[73] Assignee: Kat Mfg., Inc., West Salem, Ohio

[21] Appl. No.: 09/243,359

[22] Filed: Feb. 1, 1999

Related U.S. Application Data

[60] Provisional application No. 60/104,367, Oct. 15, 1998.
[51] Int. Cl.$^6$ ........................................................ F16L 27/08
[52] U.S. Cl. ........................ 285/276; 285/145.2; 285/312; 285/404
[58] Field of Search ............................. 285/145.2, 148.1, 285/148.3, 272.1, 276, 311, 312, 349, 379, 404, 903, FOR 145, FOR 155

[56] References Cited

U.S. PATENT DOCUMENTS

| | | | |
|---|---|---|---|
| 2,536,702 | 1/1951 | Scheiwer | 285/379 X |
| 4,222,593 | 9/1980 | Lauffenburger | 285/85 |
| 4,432,570 | 2/1984 | Kemppainen | 285/24 |
| 5,538,296 | 7/1996 | Horton | 285/276 |
| 5,547,233 | 8/1996 | Hoegger | 285/276 |
| 5,722,697 | 3/1998 | Chen | 285/91 |

FOREIGN PATENT DOCUMENTS

| | | | |
|---|---|---|---|
| 817969 | 8/1959 | United Kingdom | 285/404 |

*Primary Examiner*—Lynne Reichard
*Assistant Examiner*—Greg Binda
*Attorney, Agent, or Firm*—Christopher John Rudy

[57] ABSTRACT

Live swivel coupling has a hollow first housing and a hollow second housing, each of which is open on opposing ends in a main axial direction. The first has a generally radially symmetrical inner surface and an indentation in the inner surface, and the second has a generally radially symmetrical outer surface and an indentation in the outer surface. The indentations are for retaining a rotatable bearing set of one or more rotatable bearings when the first and second housings are coupled. The rotatable bearing set also serves as a retaining device to hold the first and second couplings together. The live swivel coupling, which can be adapted to receive a male conduit or hose terminus member that can be secured with a set of cam-locking handles, also has one or more of the following:

- an internal, axial extension of the hollow second housing;
- a plurality of rotatable bearing feed/stop members which communicate with the indentations from external the first housing;
- at least two sealing rings which form a seal between the first and second housings when they are coupled;
- a smooth flow ring for placement inside an attached hose; and
- a hose-end skirt as part of the second housing, which has a set of female threads useful for engaging helical ribs of a metal hose, optionally with one or more fastener devices in the skirt for assisting in keeping or to keep the metal hose from separating from the skirt.

The coupling can be especially useful in dry goods transfer.

16 Claims, 1 Drawing Sheet

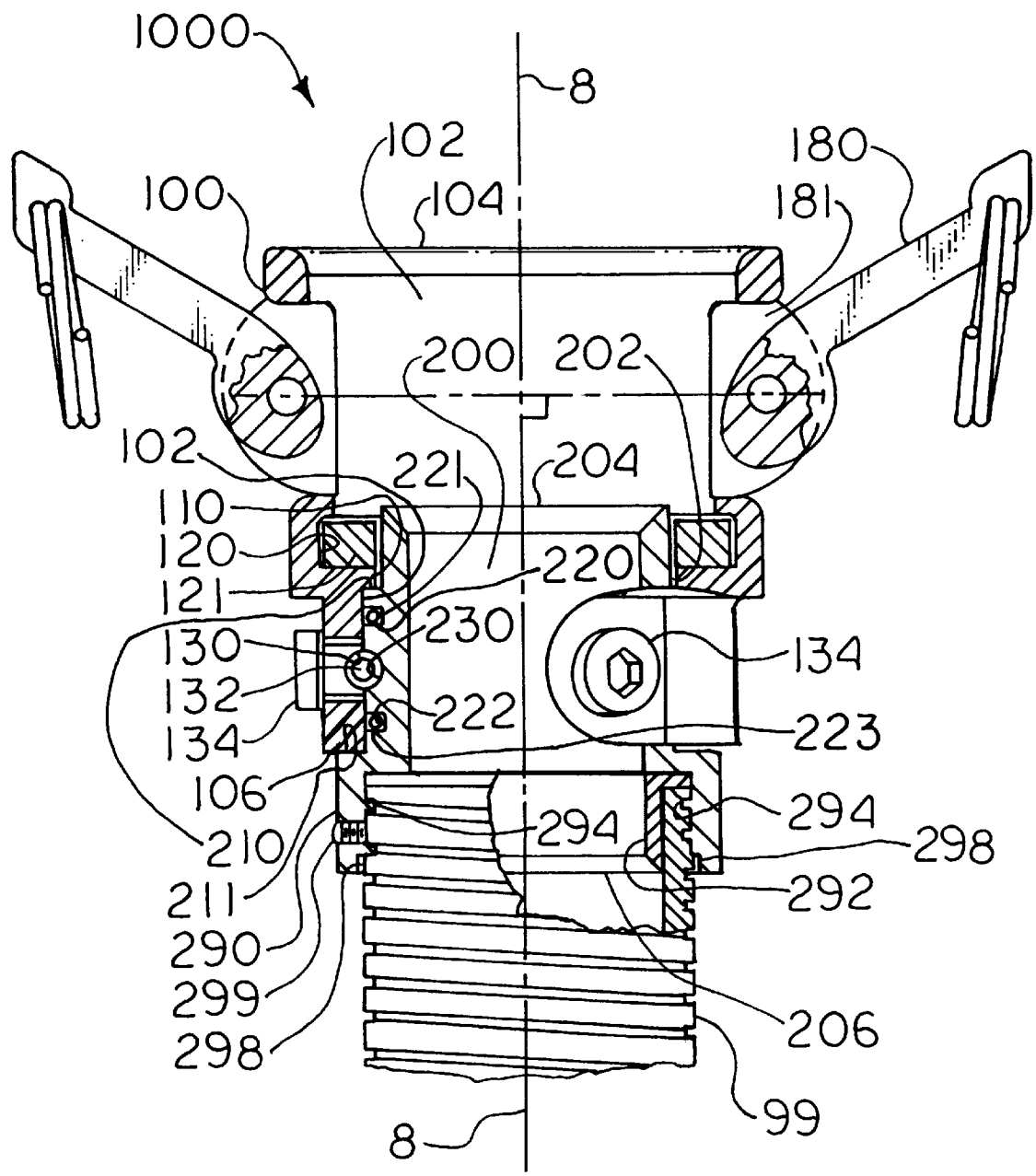

LIVE SWIVEL COUPLING

CROSS-REFERENCE TO A U.S. PROVISIONAL PATENT APPLICATION

This claims the benefit under 35 USC 119(e) of provisional application 60/104,367 filed on Oct. 15, 1998. The specification of that provisional application is incorporated herein by reference.

FIELD OF THE INVENTION

Various swiveling hose couplings are known. Among such, some fire hoses swivel and have balls to assist therewith. See also, Harle, U.S. patent application Ser. No. 08/919,379 filed Aug. 28, 1997, the specification of which is incorporated herein by reference, and which discloses a full flow and/or locking connector/quick-disconnect coupling. One shortcoming of the foregoing is that a rather full complement of balls is required in any groove intended to hold them to assist in swiveling; otherwise, the swivel may become unbalanced, and even seize up. Such a problem may be solved by supplying the full complement of balls; however, so many balls, although not expensive, may be dropped in installation, which may cause problems, especially if installed in the field.

Compare, Lauffenburger, U.S. Pat. No. 4,222,593, which discloses a fluid-conveying coupling with safety locking device; Kemppainen, U.S. Pat. No. 4,432,570, which discloses a coupling; Chen, U.S. Pat. No. 5,722,697, which discloses a fitting with two tubular members rotatable relative to each other. The above-mentioned patents to Lauffenburger, Kemppainen, and Chen, the specifications of which are incorporated herein by reference, although they disclose couplings which are "live swivels," i.e., couplings which can readily swivel during use under high pressure.

Other problems in the art exist. For example, debris from a gasket or an epoxy seal may interfere with or adulterate the material being transferred through a coupling. Seals, especially with respect to metal hoses, can be difficult to obtain. Stainless steel hoses may rotate undesirably, or break if welded. In general, field repairability may be problematical if not out of the question.

It would be desirable to improve upon the same.

SUMMARY OF THE INVENTION

The present invention provides a live swivel coupling comprising:

a hollow first housing, which is open on opposing ends in a main axial direction of the first housing, and which has a generally radially symmetrical inner surface; and an indentation in the inner surface for retaining a rotatable bearing set, when the first housing receives and is coupled with a suitable insertion housing with the rotatable bearing set therein;

a hollow second housing as the insertion housing, which is open on opposing ends in a main axial direction of the second housing, and which has a generally radially symmetrical outer surface to relate with the generally radially symmetrical inner surface of said hollow first housing when the second housing is inserted into and received by said hollow first housing; and an indentation in the outer surface for retaining the rotatable bearing set, when the second housing is inserted in and coupled with said hollow first housing; and at least one rotatable bearing as the rotatable bearing set, wherein the rotatable bearing set also serves as a retaining device to hold said first and second housings together in a direction common to the main axial directions of said hollow first and second housings when said housings are so coupled; and wherein the live swivel coupling also has at least one of the following features selected from the group consisting of:

at least two sealing rings which form a seal between said hollow first and second housings when said hollow first and second housing are coupled;

a plurality of rotatable bearing feed/stop members in communication from external said first housing, with the indentation in the inner and outer surfaces for retaining a rotatable bearing set;

an internal, axial extension of said hollow second housing;

a smooth flow ring for placement inside an attached hose;

a hose-end skirt as part of said hollow second housing, which has a set of female threads useful for engaging helical ribs of a metal hose; and at least one fastener device in said hose-end skirt for assisting in keeping or to keep the metal hose from separating from the threaded end of said second housing.

The invention is useful in transfer of materials through a conduit. It is especially useful in transfer of dry goods such as plastic pellets or foodstuffs such as flour or sugar, and so forth.

Significantly, by the invention, the art of live swivel couplings is advanced in kind. For example, with a second sealing ring such as an O-ring, dust and debris can be kept out of the conduit. As the indentations, two circumferential grooves can be provided, which, when a full complement of rotatable bearings such as ball bearings resides therein, can yet assist in providing for live swiveling in use under the very high pressures of up to 1500-psi or greater in conjunction with sealing ring(s); and with the plurality of rotatable bearing feed/stop members, which can be set screws, in communication from external said hollow first housing, with the indentation in the inner and outer surfaces for retaining a rotatable bearing set, a reduced number of rotatable bearings may be employed and remain evenly distributed for smooth swiveling and secure attachment of the two housings. The internal, axial extension of the second housing can keep a thick gasket in place in the first housing even under vacuum conditions, avoid abrasion of the gasket and consequent introduction of contaminating debris into the material transferred, and provide for smooth flow of the material. The smooth flow ring can not only provide for smooth flow of the material through the coupling but also provide a tight seal of the cut end of a metal hose. The set of female threads in the hose-end skirt of the second housing helps seal helically-ribbed metal hose such as of stainless steel, and the fastener device, which can be a set of set screws, in the hose-end skirt can help the metal hose from rotating.

The invention is efficient to make and use. Most beneficially, it can be fully repairable under field conditions. Numerous further advantages attend the invention.

DRAWINGS IN BRIEF

The drawings form part of the specification hereof. With respect to the drawings (not including the specification drawings incorporated by reference) the sole appended FIGURE depicts a side, partial cut away view of a live swivel coupling of the invention.

DETAILED DESCRIPTION OF THE INVENTION

The invention can be further understood through the present detail, which may be read in view of the drawings.

The same is to be taken in an illustrative, and not necessarily limiting, sense.

In general, and for the most part with respect to the sole appended FIGURE, live swivel coupling 1000 includes along main axial direction 8, first (receiving) housing 100 and second (insertion) housing 200. The housings 100, 200 are hollow so as to provide a conduit for material flowing therethrough and through hose 99, which may be of metal, for example, number-300 stainless steel. As is well known, a male conduit or hose terminus (not illustrated in the sole appended FIGURE but seen as feature 300 in FIG. 1 of the '367 provisional application specification) may be attached to the coupling 1000.

The receiving housing 100 has generally radially symmetrical inner surface 102 and is open on opposing ends 104, 106 in the main axial direction 8. Inwardly protruding shoulder 110 may be present, and above the shoulder 110 may be gasket-resting groove 120 in which gasket 121, which, for example, may be of Buna-N, and which may be considered a male conduit terminus sealing gasket, may reside. The indentation in the inner surface may be provided by circumferential groove 130, which can retain a portion, for example, about one-half, of rotatable bearing 132. The groove 130 may be semi-circular in cross-section to accommodate a ball bearing as the rotating bearing 132. The bearing 132 is generally part of a set of a plurality of rotatable bearings such as the ball bearings. Other indentation 130 types may include provision of a set of hollow sockets or circumferential troughs, and other rotatable bearings 132 may include cylindrical discs or rods, or needle bearings, which may be particularly adapted for employment with corresponding groove(s) 130. Although further gasket groove(s) and/or step(s) may be provided in the inner surface 102, preferably the remaining lower portion of the inner surface 102 is substantially cylindrical and smooth (and thus without such groove(s) and/or step(s) as, for example, depicted in FIGS. 2–4 of the aforesaid provisional patent application specification). Two or more bearing feed stop members 134, for example, set screws, are in communication with the circumferential groove 130 from a point exterior the housing 100 and are spaced along the groove 130 to form, for example, when the set screws are tightened and enter the groove 130, a plurality of sectors in which at least one rotatable bearing 132 from the set of rotatable bearings can reside and be retained. Preferably, there are three set screws 134 positioned at about one hundred twenty degrees along the circumference formed by the groove 130. However, there may be more than three feed/stop members 134, which may or may not be evenly spaced along the groove 130. Accordingly, for instance, there may be provided six set screws 134, each evenly spaced at about sixty degrees along the aforementioned groove 130. The members 134 may serve to plug up a hole to feed rotatable bearing(s) 132 as well as stop rotatable bearings 132 from traveling from one sector to an adjacent sector in the groove 130.

The insertion housing 200 has generally radially symmetrical outer surface 202 for relating with the generally radially symmetrical inner surface 102 of the receiving housing 100. The insertion housing 200, too, is open on opposing ends 204, 206 in the main axial direction 8. One of the ends can present the internal, axial extension 204 of the hollow housing 200, which extension can pass by the gasket 121, say, about 0.010 to 0.015 of an inch, or more, when the first and second housings 100, 200 are coupled, and thus keep the gasket 121 in place during the transfer of materials with the coupling 1000, even under vacuum. Top shoulder 210 may be present and come into close proximity with the shoulder 110 when the housings 100, 200 are coupled. Alternatively or in addition to the top shoulder 210, lower shoulder 211 may be present, which may come into close proximity with the lower end of the receiving housing when the housings 100, 200 are coupled. Upper groove 220 can retain upper sealing ring or gasket 221, which, for example, may be a Buna-N O-ring, and which can function as a pressure seal. Lower groove 222 can retain lower sealing ring or gasket 223, which, for example, may be another Buna-N O-ring, and which can function as a dust seal. The indentation in the outer surface may be provided by circumferential groove 230, which can also retain a portion, for example, about one-half, of the rotatable bearing 132 in conjunction with the indentation in the inner surface 130. The groove 230 may also be semi-circular in cross-section to accommodate a ball bearing as the rotatable bearing 132. Accordingly, a combined groove space 130, 230 is provided in which the rotatable bearings 132 are retained, and not only does the set of rotatable bearings serve to facilitate a greater swiveling capacity, including during transfer of materials, but also the set 132 serves as a housing stop in a direction common to the main axial direction 8 of the first housing 100 and second housing 200 when these housings are coupled to form the live swivel coupling 1000. Other indentation(s)/groove(s) and/or gasket(s) or rotatable bearing(s) and so forth may be present. Hose skirt 290 may be present, as well as can smooth flow ring 292, which may be generally T-shaped in cross-section and have a beveled internal bottom end, to accommodate insertion of the hose, provide a good hose end seal, and yet provide for a full, smooth flow of material therethrough. Internal (female) threads 294, which can include spaced out studs and so forth serving as threads, can engage the helical ribs of a metal hose 99. The hose 99 may be secured in place by soft epoxy glue in epoxy pocket 298 and/or by fastener device 299, for example, a screw, in the hose skirt 290. Soft epoxy has the advantage of being able to serve not only as a sealant, but also it may be removed with relative ease to assist in making the coupling 1000 fully field repairable. Preferably, there are a plurality, for example, three, hose lock screws 299 positioned at intervals, say one hundred twenty degrees, around the hose skirt 290.

The live swivel coupling of the invention can be made of any suitable material. For example, the housings 100, 200 can be made from aluminum bar stock from extruded aluminum, which is machined to the desired dimensions, say, to a standard two-inch or four-inch or six-inch or even a non-standard size; auxiliary components or features of the live swivel coupling may include steel ball bearings 132; steel screws 134, 299; brass arms with steel finger rings in the cam-locking handles 180; and smooth flow ring 292 of machined aluminum bar stock. Investment stainless steel may be employed.

CONCLUSION

The present invention is thus provided. Various features, subcombinations and combinations may be practiced with or without reference to other features, subcombinations or combinations of the invention, and numerous adaptations and modifications can be effected within its spirit, the literal claim scope of which is particularly pointed out as follows:

I claim:

1. A live swivel coupling comprising:
    a hollow first housing, which is open on opposing ends in a main axial direction of the first housing, and which has a generally radially symmetrical inner surface; an indentation in the inner surface for retaining a rotatable bearing set, when the first housing receives and is coupled with a suitable insertion housing with the rotatable bearing set therein; and an internal shoulder and a gasket resting groove above the shoulder for receiving a male conduit or hose terminus sealing gasket for sealing with a male conduit or hose terminus which can be received through one of the opposing ends of the hollow first housing above the shoulder;

a hollow second housing as the insertion housing, which is open on opposing ends in a main axial direction of the second housing, and which has a generally radially symmetrical outer surface to relate with the generally radially symmetrical inner surface of said hollow first housing when the second housing is inserted into and received by said hollow first housing through the other of the opposing ends of said hollow first housing below the shoulder of said hollow first housing; an indentation in the outer surface for retaining the rotatable bearing set in conjunction with the indentation in the inner surface of said hollow first housing, when the second housing is inserted in and coupled with said hollow first housing; and an internal, axial extension; and at least two sealing rings which form a seal between said hollow first and second housings when said hollow first and second housings are coupled;

at least one rotatable bearing as the rotatable bearing set, wherein the rotatable bearing set also serves as a retaining device to hold said first and second housings together in a direction common to the main axial directions of said hollow first and second housings when said housings are coupled; and wherein said hollow first housing is also adapted to receive, in addition to said hollow second housing, the male conduit or hose terminus, which can be attached to the live swivel coupling.

2. The coupling of claim 1, wherein said first housing includes, in the gasket resting groove, the male conduit or hose terminus sealing gasket; and wherein the internal, axial extension of said hollow second housing, which is present to keep said terminus sealing gasket in place during use, passes by said terminus sealing casket when said first and second housings are coupled.

3. The coupling of claim 2, wherein there are present only two sealing rings, one above and one below said indentations; and a smooth flow ring having a beveled internal bottom end for placement inside a hose attached to said second housing.

4. The coupling of claim 3, wherein there are present a plurality of rotating bearings as the rotating bearing set; a hose-end skirt as part of said hollow second housing, which has a set of female threads useful for engaging helical ribs of a metal hose; and at least one fastener device in said hose-end skirt.

5. The coupling of claim 3, wherein there are present a plurality of rotating bearings as the rotating bearing set, which are ball bearings; said indentations are grooves with semicircular cross-sections; the two sealing rings above and below said indentations are O-rings; and there are three bearing feed/stop members.

6. The coupling of claim 1, wherein there are present only two sealing rings, one directly above and one directly below said indentations.

7. The coupling of claim 1, wherein there are present a plurality of rotatable bearing feed/stop members, which communicate with said indentations from external said hollow first housing.

8. The coupling of claim 1, wherein there is present a set of cam-locking handles with said hollow first housing for securing the male conduit or hose terminus.

9. The coupling of claim 1, wherein there is present a smooth flow ring for placement inside a hose attached to said second housing.

10. The coupling of claim 1, wherein there is present a hose-end skirt which has a set of female threads useful for engaging helical ribs of a metal hose.

11. The coupling of claim 10, having at least one fastener device in said hose-end skirt useful for assisting in keeping or to keep the metal hose from separating from said second housing.

12. A live swivel coupling comprising:

a hollow first housing, which is open on opposing ends in a main axial direction of the first housing, and which has a generally radially symmetrical inner surface; and an indentation in the inner surface for retaining a rotatable bearing set, when the first housing receives and is coupled with a suitable insertion housing with the rotatable bearing set therein;

a hollow second housing as the insertion housing, which is open on opposing ends in a main axial direction of the second housing, and which has a generally radially symmetrical outer surface to relate with the generally radially symmetrical inner surface of said hollow first housing when the second housing is inserted into and received by said hollow first housing; and an indentation in the outer surface for retaining the rotatable bearing set, when the second housing is inserted in and coupled with said hollow first housing;

at least two rotatable bearing feed/stop members which communicate with said indentations from external said hollow first housing; and a plurality of rotatable bearings as the rotatable bearing set, wherein the rotatable bearing set also serves as a retaining device to hold said first and second housings together in a direction common to the main axial directions of said hollow first and second housings when said housings are coupled.

13. The coupling of claim 12, wherein said indentations are formed by a circumferential groove in both the inner and outer surfaces; the at least two rotatable bearing feed/stop members are spaced along the circumferential groove to form, when the bearing feed/stop members enter the groove, a plurality of sectors in the circumferential groove; and at least one rotatable bearing from the rotatable bearing set in each sector.

14. The coupling of claim 13, wherein there are three bearing feed/stop members.

15. The coupling of claim 14, wherein said hollow second housing has an internal, axial extension.

16. The coupling of claim 13, wherein said hollow second housing has an internal, axial extension.

* * * * *